(12) United States Patent
Shrivastava et al.

(10) Patent No.: US 7,792,860 B2
(45) Date of Patent: Sep. 7, 2010

(54) SYSTEM FOR CHANGE NOTIFICATION AND PERSISTENT CACHING OF DYNAMICALLY COMPUTED MEMBERSHIP OF RULES-BASED LISTS IN LDAP

(75) Inventors: Saurabh Shrivastava, Fremont, CA (US); Jason Sharma, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 320 days.

(21) Appl. No.: 11/090,618

(22) Filed: Mar. 25, 2005

(65) Prior Publication Data

US 2006/0218147 A1    Sep. 28, 2006

(51) Int. Cl.
*G06F 7/00* (2006.01)

(52) U.S. Cl. .................................... 707/786; 707/756

(58) Field of Classification Search ................ 707/716, 707/756, 786, 793, 803
See application file for complete search history.

(56) References Cited

U.S. PATENT DOCUMENTS

| | | | | |
|---|---|---|---|---|
| 5,485,550 A * | 1/1996 | Dalton | ........................ | 706/52 |
| 5,671,139 A * | 9/1997 | Bessacini et al. | .............. | 701/27 |
| 5,761,499 A * | 6/1998 | Sonderegger | ...................... | 1/1 |
| 5,903,559 A * | 5/1999 | Acharya et al. | ............. | 370/355 |
| 5,905,984 A * | 5/1999 | Thorsen | ............. | 1/1 |
| 5,944,762 A * | 8/1999 | Bessacini et al. | .............. | 701/27 |
| 5,970,494 A * | 10/1999 | Velissaropoulos et al. | .......... | 1/1 |
| 6,088,475 A * | 7/2000 | Nagashima et al. | ......... | 382/162 |
| 6,304,974 B1 | 10/2001 | Samar | | |
| 6,308,181 B1 * | 10/2001 | Jarvis | ................ | 1/1 |
| 6,377,991 B1 * | 4/2002 | Smith et al. | ................. | 709/226 |
| 6,401,096 B1 * | 6/2002 | Zellweger | ............ | 1/1 |
| 6,466,941 B1 * | 10/2002 | Rowe et al. | ........ | 1/1 |
| 6,487,547 B1 | 11/2002 | Ellison et al. | | |
| 6,529,885 B1 | 3/2003 | Johnson | | |
| 6,542,898 B1 * | 4/2003 | Sullivan et al. | ..................... | 1/1 |
| 6,587,856 B1 | 7/2003 | Srinivasan et al. | | |
| 6,615,223 B1 | 9/2003 | Shih et al. | | |
| 6,675,261 B2 * | 1/2004 | Shandony | .................... | 711/121 |
| 6,678,835 B1 * | 1/2004 | Shah et al. | ..................... | 714/4 |
| 6,691,117 B2 | 2/2004 | Ellison et al. | | |
| 6,704,743 B1 * | 3/2004 | Martin | .............................. | 1/1 |
| 6,744,544 B1 * | 6/2004 | Nagashima et al. | ......... | 358/518 |
| 6,748,374 B1 | 6/2004 | Madan et al. | | |
| 6,785,664 B2 * | 8/2004 | Jameson | ...................... | 706/47 |

(Continued)

OTHER PUBLICATIONS

Bellare, M. et al. "Foundations of Group Signatures: The Case of Dynamic Groups" Proceedings of the RSA Conference 2005, San Francisco, CA, Feb. 14-18, 2005, pp. 1-31.

(Continued)

*Primary Examiner*—Shahid A Alam
*Assistant Examiner*—Alexandria Y Bromell
(74) *Attorney, Agent, or Firm*—Vista IP Law Group, LLP.

(57) ABSTRACT

A system, method, computer program and article of manufacture for membership list management is described. A rules-based membership list is built and cached. Any modifications to the member objects are incrementally added to the cache, and are submitted to a change log. Queries access the membership in the cache instead of having to execute the rules to build the list. The change log entries allow membership modification notifications to be sent to any subscribing application.

29 Claims, 6 Drawing Sheets

U.S. PATENT DOCUMENTS

| | | |
|---|---|---|
| 6,789,088 B1 * | 9/2004 | Lee et al. ............................ 1/1 |
| 6,795,830 B1 | 9/2004 | Banerjee et al. |
| 6,834,286 B2 | 12/2004 | Srinivasan et al. |
| 6,898,577 B1 | 5/2005 | Johnson |
| 6,941,282 B1 | 9/2005 | Johnson |
| 6,944,626 B2 * | 9/2005 | Cameron et al. .................... 1/1 |
| 6,973,460 B1 * | 12/2005 | Mitra ................................ 1/1 |
| 6,988,102 B2 | 1/2006 | Rossiter et al. |
| 6,993,180 B2 * | 1/2006 | Sun et al. ..................... 382/165 |
| 6,993,657 B1 | 1/2006 | Renner et al. |
| 7,016,845 B2 | 3/2006 | Vora et al. |
| 7,020,644 B2 * | 3/2006 | Jameson ...................... 706/47 |
| 7,031,954 B1 * | 4/2006 | Kirsch ................................ 1/1 |
| 7,032,022 B1 * | 4/2006 | Shanumgam et al. ....... 709/225 |
| 7,035,840 B2 | 4/2006 | Nakos et al. |
| 7,051,039 B1 | 5/2006 | Murthy et al. |
| 7,058,639 B1 | 6/2006 | Chatterjee et al. |
| 7,062,563 B1 | 6/2006 | Lewis et al. |
| 7,069,270 B1 | 6/2006 | Kumar |
| 7,080,077 B2 * | 7/2006 | Ramamurthy et al. .............. 1/1 |
| 7,085,834 B2 | 8/2006 | Delany et al. |
| 7,086,029 B1 * | 8/2006 | Barras et al. .................... 716/17 |
| 7,096,213 B2 | 8/2006 | Chatterjee et al. |
| 7,114,037 B2 | 9/2006 | Agarwal et al. |
| 7,120,037 B2 | 10/2006 | Komatsu et al. |
| 7,124,203 B2 | 10/2006 | Joshi et al. |
| 7,134,137 B2 | 11/2006 | Joshi et al. |
| 7,136,867 B1 | 11/2006 | Chatterjee et al. |
| 7,150,038 B1 | 12/2006 | Samar |
| 7,162,480 B2 * | 1/2007 | Vishik ................................ 1/1 |
| 7,171,411 B1 | 1/2007 | Lewis et al. |
| 7,174,319 B2 | 2/2007 | Johnson |
| 7,185,364 B2 | 2/2007 | Knouse et al. |
| 7,194,764 B2 | 3/2007 | Martherus et al. |
| 7,206,851 B2 | 4/2007 | Delaney et al. |
| 7,213,249 B2 | 5/2007 | Tung Loo et al. |
| 7,216,163 B2 | 5/2007 | Sinn |
| 7,225,256 B2 | 5/2007 | Villavicencio |
| 7,231,661 B1 | 6/2007 | Villavicencio et al. |
| 7,249,369 B2 | 7/2007 | Knouse et al. |
| 7,249,375 B2 | 7/2007 | Bhatia et al. |
| 7,289,990 B2 * | 10/2007 | Gupta ................................ 1/1 |
| 7,296,297 B2 * | 11/2007 | Kirkpatrick et al. ........... 726/30 |
| 7,366,708 B2 * | 4/2008 | Jalali et al. ......................... 1/1 |
| 7,394,817 B2 * | 7/2008 | Yap ............................. 370/400 |
| 7,415,671 B2 * | 8/2008 | Sylor et al. .................. 715/736 |
| 7,499,939 B2 * | 3/2009 | Jandhyala et al. .................... 1/1 |
| 2002/0138763 A1 * | 9/2002 | Delany et al. ................ 713/201 |
| 2002/0186238 A1 * | 12/2002 | Sylor et al. .................... 345/736 |
| 2003/0059107 A1 * | 3/2003 | Sun et al. ..................... 382/165 |
| 2003/0191739 A1 | 10/2003 | Chatterjee et al. |
| 2004/0076155 A1 * | 4/2004 | Yajnik et al. ................. 370/389 |
| 2004/0111375 A1 | 6/2004 | Johnson |
| 2004/0153438 A1 | 8/2004 | Rossiter et al. |
| 2004/0172368 A1 | 9/2004 | Johnson |
| 2004/0210582 A1 | 10/2004 | Chatterjee et al. |
| 2004/0243576 A1 | 12/2004 | Shrivastava et al. |
| 2005/0018853 A1 * | 1/2005 | Lain et al. .................... 380/277 |
| 2005/0044147 A1 * | 2/2005 | Yap ............................. 709/205 |
| 2005/0114478 A1 * | 5/2005 | Popescu et al. .............. 709/220 |
| 2005/0165807 A1 | 7/2005 | Srinivasan et al. |
| 2005/0190692 A1 | 9/2005 | Singh et al. |
| 2005/0190755 A1 | 9/2005 | Singh et al. |
| 2005/0222963 A1 | 10/2005 | Johnson |
| 2005/0257211 A1 | 11/2005 | Chatterjee et al. |
| 2005/0278384 A1 | 12/2005 | Lin et al. |
| 2005/0289174 A1 | 12/2005 | Kolli et al. |
| 2005/0289342 A1 | 12/2005 | Needham et al. |
| 2006/0004779 A1 | 1/2006 | Rossiter et al. |
| 2006/0047641 A1 | 3/2006 | Keni |
| 2006/0059539 A1 | 3/2006 | Shashikumar et al. |
| 2006/0064434 A1 * | 3/2006 | Gilbert et al. ............ 707/104.1 |
| 2006/0085440 A1 * | 4/2006 | Jandhyala et al. ........... 707/100 |
| 2006/0085443 A1 | 4/2006 | Pae et al. |
| 2006/0122859 A1 * | 6/2006 | Feldman et al. ................. 705/1 |
| 2006/0123024 A1 | 6/2006 | Sathyanarayan et al. |
| 2006/0143210 A1 | 6/2006 | Avery |
| 2006/0149760 A1 | 7/2006 | Keni et al. |
| 2006/0155777 A1 | 7/2006 | Shih et al. |
| 2006/0155778 A1 | 7/2006 | Sharma et al. |
| 2006/0173849 A1 | 8/2006 | Paul |
| 2006/0184423 A1 | 8/2006 | Krishnamoorthy |
| 2006/0195450 A1 | 8/2006 | Chatterjee et al. |
| 2006/0195575 A1 | 8/2006 | Delany et al. |
| 2006/0218147 A1 | 9/2006 | Shrivastava et al. |
| 2006/0284455 A1 * | 12/2006 | Terech ................... 297/180.14 |
| 2007/0027986 A1 | 2/2007 | Joshi et al. |
| 2007/0044144 A1 | 2/2007 | Knouse et al. |
| 2007/0089167 A1 | 4/2007 | Villavicencio |
| 2007/0101440 A1 | 5/2007 | Bhatia et al. |
| 2007/0112700 A1 * | 5/2007 | Den Haan et al. ............. 706/14 |
| 2007/0118878 A1 | 5/2007 | Sastry et al. |
| 2007/0129953 A1 * | 6/2007 | Cunningham et al. .......... 705/1 |
| 2007/0130616 A1 | 6/2007 | Ng et al. |
| 2007/0162420 A1 | 7/2007 | Ou et al. |
| 2007/0168530 A1 | 7/2007 | Delaney et al. |
| 2007/0174905 A1 | 7/2007 | Martherus et al. |
| 2007/0208713 A1 | 9/2007 | Krishnaprasad et al. |
| 2007/0208714 A1 | 9/2007 | Ture et al. |
| 2007/0208734 A1 | 9/2007 | Koide et al. |
| 2007/0208744 A1 | 9/2007 | Krishnaprasad et al. |
| 2007/0208745 A1 | 9/2007 | Ture et al. |
| 2007/0208746 A1 | 9/2007 | Koide et al. |
| 2007/0208755 A1 | 9/2007 | Bhatkar et al. |
| 2007/0209080 A1 | 9/2007 | Ture et al. |
| 2007/0214129 A1 | 9/2007 | Ture et al. |
| 2007/0220268 A1 | 9/2007 | Krishnaprasad et al. |
| 2007/0226695 A1 | 9/2007 | Krishnaprasad et al. |
| 2007/0245349 A1 | 10/2007 | Sinn |
| 2007/0250486 A1 | 10/2007 | Liao et al. |
| 2007/0271280 A1 | 11/2007 | Chandasekaran |
| 2007/0283425 A1 | 12/2007 | Ture et al. |
| 2009/0094050 A1 * | 4/2009 | Yoshida et al. .................. 705/1 |
| 2009/0157687 A1 * | 6/2009 | Taylor et al. .................... 707/9 |

OTHER PUBLICATIONS

Oracle Corporation "Oracle Application Server 10g New Features Overview" a Technical White Paper, Dec. 2003, Title page, copyright page, table of contents, 43 pgs., Oracle Corporation, Redwood Shores, CA.

Oracle Corporation, "Oracle® Internet Directory Administrator's Guide" 10g (9.0.4), Title page, copyright page, table of contents, 506 pgs., Oracle Corporation, Redwood Shores, CA.

* cited by examiner

SYSTEM FOR CHANGE NOTIFICATION AND PERSISTENT CACHING OF DYNAMICALLY COMPUTED MEMBERSHIP OF RULES-BASED LISTS IN LDAP

BACKGROUND AND SUMMARY

In large enterprises the need for membership lists management is significant. The number of potential applications of such lists is vast. Some example applications are authorization systems that use lists to represent "Role Assignments" or email systems that use lists for the purpose of maintaining a "Mailing List." The costs, both administrative and performance, associated with use of membership groups are significant. There are two general methods for administration and use of membership groups—static lists and rules-based lists.

Static lists are one method for managing membership lists. A static list is a physical listing of user names. No other attributes of the user are included in a static list. Accessing static lists is inexpensive. To access the list, a simple fetch operation is used. On the other hand, modifications to the list are statically maintained, creating an enormous administration workload to maintain the lists. For example, the membership lists must be individually identified and edited each time an individual is added, deleted, or modified.

For example, if a new employee joins a human resources department in an organization, that new employee is added to several membership groups. The new employee may be added to the "all employee" e-mail list, the "human resource department" e-mail list, the "benefits software" application permission list, the "performance review software" access list, the "compensation software" application permission list, or any number of lists that the organization has created. If this new employee leaves the organization, the employee may need to be removed from all the groups to which he was added. If the employee changes departments within the organization, the employee may need to be removed from some or all of his current lists and added to new lists. The nature of these changes when static membership lists are employed is administratively burdensome.

Rules-based lists are another method for managing membership lists. Memberships of rules-based lists are built each time they are accessed by the execution of one or more rules and are sometimes referred to as dynamic lists. There is no physically stored membership, hence there is no physical list to update and therefore there is no administrative burden of maintaining such lists. For example, the rules are executed to have a new employee added to the membership list. Such a rule can be stated as "all individuals whose manager attribute value directly or indirectly references ManagerA" where ManagerA is the name of the manager of the Human Resources Department.

While rules-based lists offer a significant advantage in administration, the performance costs are a major hindrance to their widespread application. The dynamic nature of these lists mandates that the membership be computed each time the groups are accessed, in contrast, the static nature of static lists allows quick retrievals. Rules-based lists do not persistently store membership, thus, queries such as "return all the roles of User1" become computationally expensive since this requires that the membership of User1 be determined for all rules-based lists.

An additional limitation of the rules-based lists is that it is difficult to provide change notifications to other applications related to the changes in membership of the list without incurring additional computational expenses. Such is the case because the membership is not explicitly administered and hence changes in membership are unknown. Therefore, the membership must be built by executing the rules each time the list is accessed to obtain the most up to date membership.

Such limitations have resulted in restricted use of the rules-based lists. In situations where performance is critical, rules-based lists are not deployed in favor of static lists that are efficient, albeit they require significant effort in terms of administration.

A solution has been provided for a membership lists that provides the management benefits of a rules-based list with the efficient lookup of a static list. An example, method of managing a membership list includes: executing a set of membership rules to create a membership list, caching the created membership list in storage, and updating the membership list cache as and when member objects are modified. An example system for managing membership lists includes a set of rules, a cache, a cache accessing module, a rule modification module, a cache updating module, and a change notification module.

DETAILED DESCRIPTION OF INVENTION

A method, system, and computer program product for change notification and persistent caching of dynamically computed membership of rules-based lists in LDAP is described. This solution provides the administration benefits of a rules-based list with the efficient lookup of a static list. To accomplish this, in one embodiment, a method of managing a membership list includes executing a set of membership rules to create the membership of a dynamically computed membership list, caching the computed membership in storage allowing efficient access to the list via the persistent cache, and modifying the membership cache when member objects are updated. The embodiments of this disclosure describes the membership node structure, access, and change management in detail.

Node Structure

Lightweight Directory Access Protocol (LDAP) is an online directory service protocol defined by the Internet Engineering Task Force (IETF). An LDAP directory entry is a collection of attributes with a unique identifier, called a distinguished name (DN). An LDAP directory organizes the entries or objects (i.e., member objects) in a hierarchical structure of nodes, sometimes referred to as a tree. Member objects include a user name and all attributes of that user.

Some example user attributes can include "area code," "department," "Manager," "role," etc.

Each rules-based membership list can have one or more rules associated with it. The membership of the list is based on the rules. In some embodiments each rule has a base, scope, and a filter criterion. The base identifies highest level of criteria for that rule (i.e., which node in the LDAP tree does this rule associate with), the scope identifies a second level of criteria for that rule (i.e., how deep from the base), and the filter specifies the selection criteria for membership objects. Scope can be specified, for example, as base level, a child of base level but not including the base, or all entries below and including the base.

One embodiment organizes the membership lists in a hierarchical structure based on the base specified in the rules of all the rules-based membership lists. Each node in the hierarchical structure has one or more membership lists associated with it. In some embodiments the hierarchical structure includes a plurality of hierarchical structures of sparse trees.

As mentioned above, in some embodiments, each rule of the membership list includes a base, a scope or level, and a filter. The base of the rule determines with which node in an LDAP tree hierarchy the membership list is associated. Each node in the in the tree structure maintains a list of all the membership lists within the node (by a List ID) along with associated levels and filters in the form of a Link List. A filter specifies criteria that may be used in a query. For example, to build memberships lists of all users based on their area codes in California, a tree structure may have a node regarding "California" as a base node, membership lists including membership ID and filter information as nodes in the linked list associated with the California node in the tree, and each node in the link list specifying the specific area code as filter for that membership list (e.g. "415," "650," "408," and "all users"). In this example, the filter for the "area code" node Link List includes "List ID1-area code=415, List ID2-area code=650, List ID3-area code=408, and List ID4-all users". The base, level, and filter associated with the membership List ID in the Link List provide a mechanism to quickly identify and locate membership lists. This is discussed further in the change management section.

In some embodiments, attributes of each membership list includes a cache enabled state, and a cache state. The cache enabled state indicates if the membership list can be cached, or not. The cache state indicates the current status of the cache. In some embodiments the cache state can be valid, invalid, or being updated.

Overview

Figure 1A:
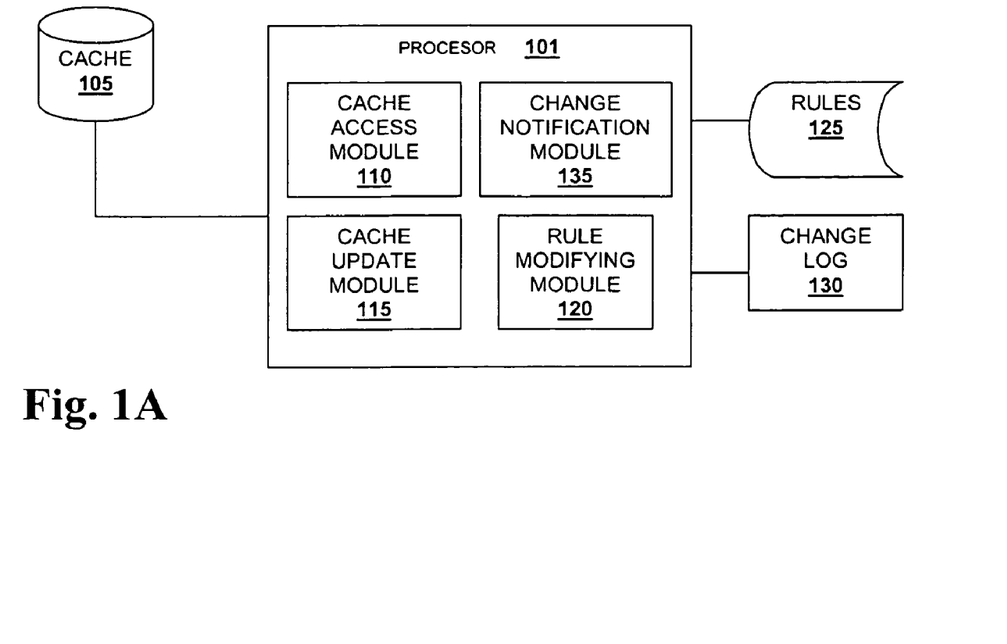
FIG. 1A is an illustration of an example system for change notification and persistent caching of dynamically computed membership of rules-based lists in LDAP.

FIG. 1A shows an embodiment of a system for change notification and persistent caching of dynamically computed membership of rules based lists in LDAP. Processor 101 executes rules 125. The resulting calculated membership list is stored in cache 105. A membership request will cause cache access module 110 to retrieve membership lists from cache 105. A membership object change will cause cache update module 115 to make changes to membership lists in cache 105 and record the changes into change log 130. Change notification module 135 sends change notices to subscribing applications based on the change log 130. A rule change will cause rule modifying module 120 to make change to the rules 125.

Figure 1B:
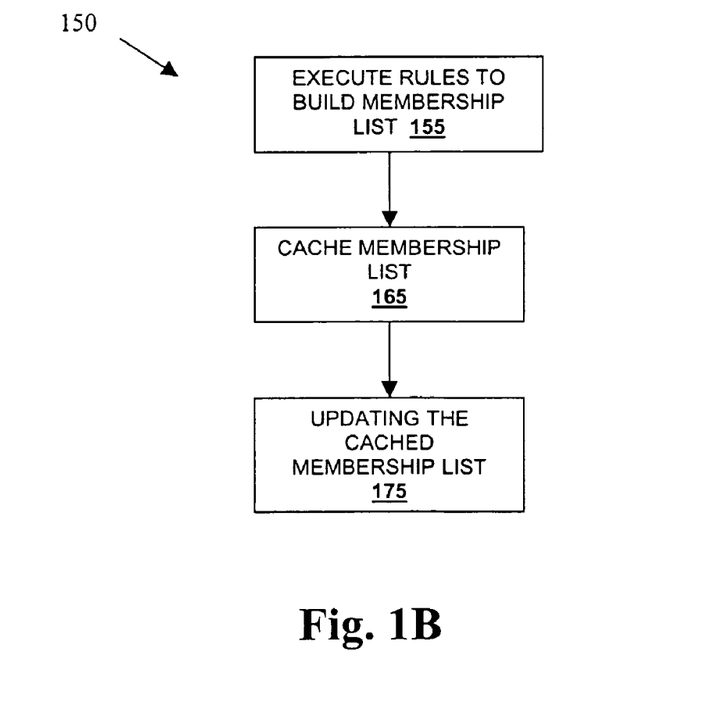
FIG. 1B is an illustration of process 150, an overview of the caching and updating of rules-based membership lists process.

An example embodiment of process 150, an overview of caching rules-based membership lists and change management, is shown in FIG. 1B. In process action 155 the rules are executed to build a membership list. The built membership list is cached in process action 165. Determining if the membership list has been modified occurs in process action 165. Process action 175 updates the previously cached membership list. Further information detailing these steps is below.

Caching and Access

Figure 2:
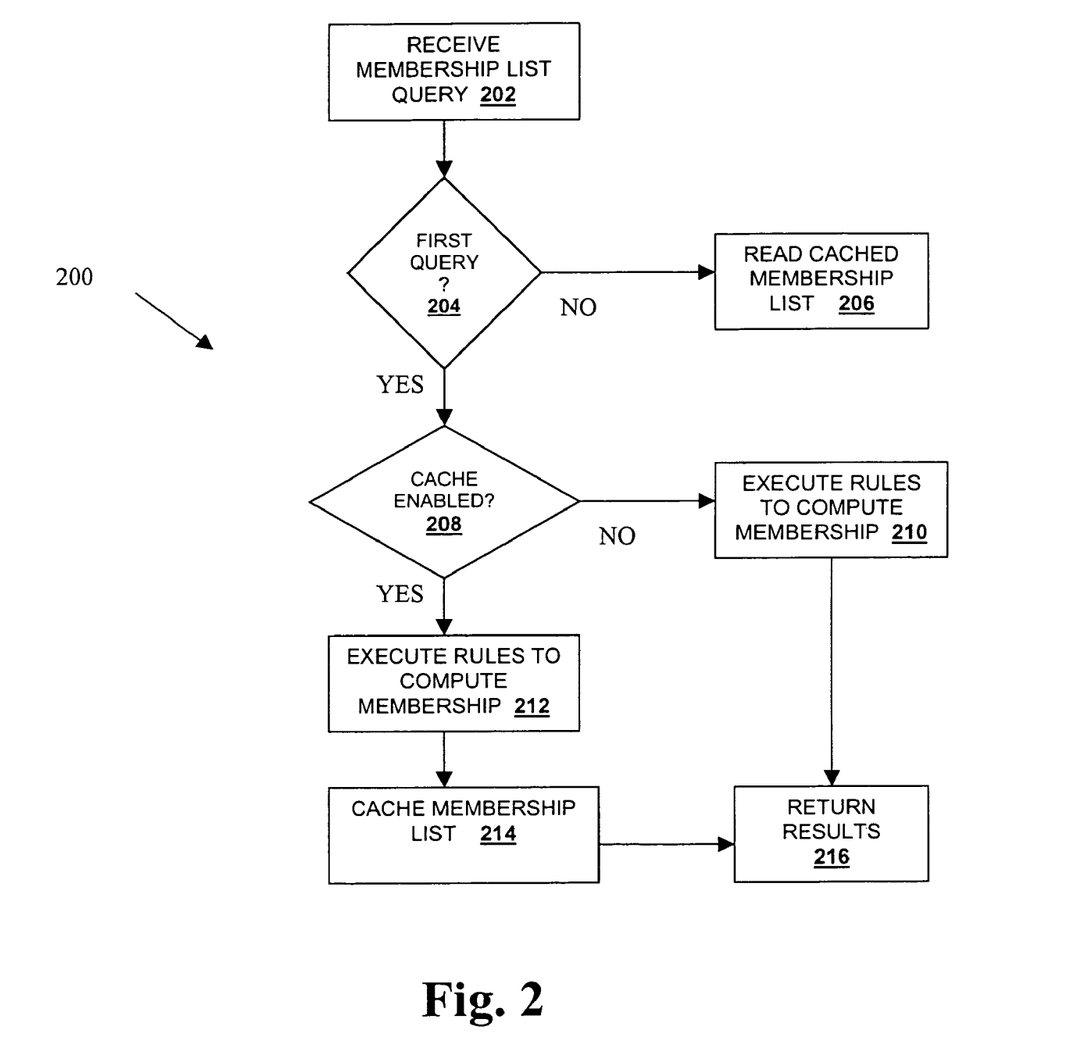
FIG. 2 is an illustration of process 200, the receive a membership list query process.

Caching and access are interrelated as the membership list is not built and cached until the first query request for the list is received. An embodiment of process 200, which is a receiving a membership list query process, is shown in FIG. 2. A membership list query is received in process action 202. Process action 204 determines if this is the first time this membership list has been queried. If not, process action 206 reads the previously cached membership list. If yes, process action 208 determines if the membership list is cache enabled. If the membership list is not cache enabled, process action 210 executes the rules to compute the membership list. Process action 216 returns the membership list to the requester. If the membership list is cache enabled, process action 212 executes the rules to compute the membership list, process action 214 stores the membership list in a storage structure, and process action 216 returns the list to the requestor. In some embodiments the storage structure is persistent. A persistent membership list allows the system to continue from where any processing left off in the event of down time (e.g., power loss) without having to re-execute all the changes made to the membership list.

One example of the use of this process is an enterprise implementing a new software application prompting the use of a new rules-based membership list for application access rights. When a user tries to access the application, the application sends a query requesting the membership list. If the request is the first request, the rule(s) for the list are executed, building the list. The application reads the membership list to determine if the user has the appropriate rights. The list is cached in storage if cache enabled. The next user to access the application, causes another access query. This query, and each subsequent query, can access the cached membership list instead of having to execute the membership rules to build the list. One embodiment of the accessing process is explained in more detail below.

Figure 3:
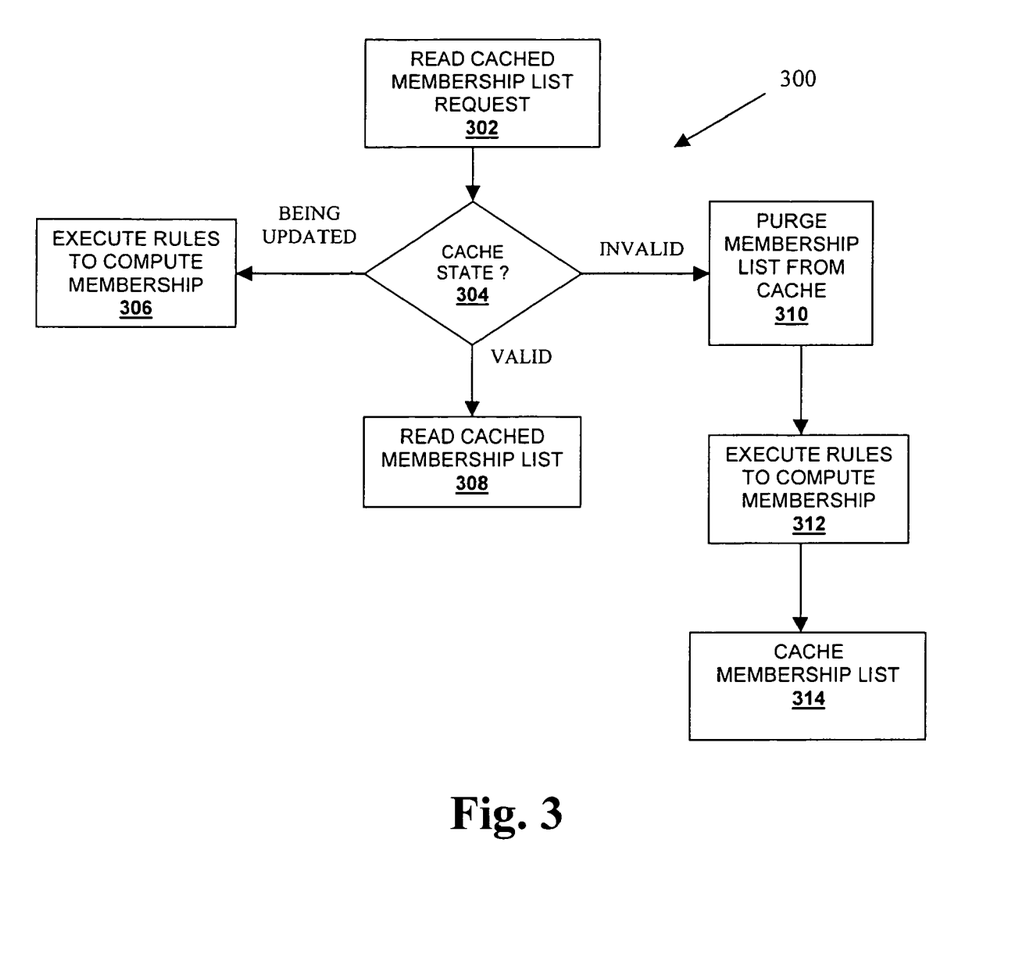
FIG. 3 is an illustration of process 300, the read the cached membership list process.

When process action 206 of FIG. 2 reads the membership list, process 300 is triggered. An embodiment of process 300, which is the read the cached membership list process, is shown in FIG. 3. In process action 302 a read the cached membership list request is received. Process action 304 determines the state of the cache to be "being updated," "valid," or "invalid." The setting of these states is further described in the Change Management section below. If the cache state is "being updated," process action 306 executes the rules to compute the membership so that the processing of the membership update does not delay the request. If the cache state is "valid," process action 308 accesses/reads the membership list from the cache. If the state of the cache is "invalid," process action 310 purges the membership list from the cache, process action 312 executes the rules to compute the membership list, and process action 314 stores the recomputed membership list in the cache and sets the cache state to valid.

In another embodiment, the membership cache contains static members in addition to the rules-based members. When the cache state is found to be invalid during execution of process 300, only the rules-based members are purged from the cache in process action 310, and added back in to the cache in process action 314. The static members remain in the cache throughout the process.

Change Management

Among other things, managing membership lists involves handling changes. Example changes include membership object changes such as adding a member or modifying a member attribute, this results from a change in the member object and not in the rules-based list explicitly and membership rule changes such as changing the name of ManagerA in the example rule "all individuals whose manager attribute value directly or indirectly references ManagerA." When a membership object is changed, the cache state is set to "being updated." When a membership rule is changed, the cache state is set to "invalid."

Figure 4:
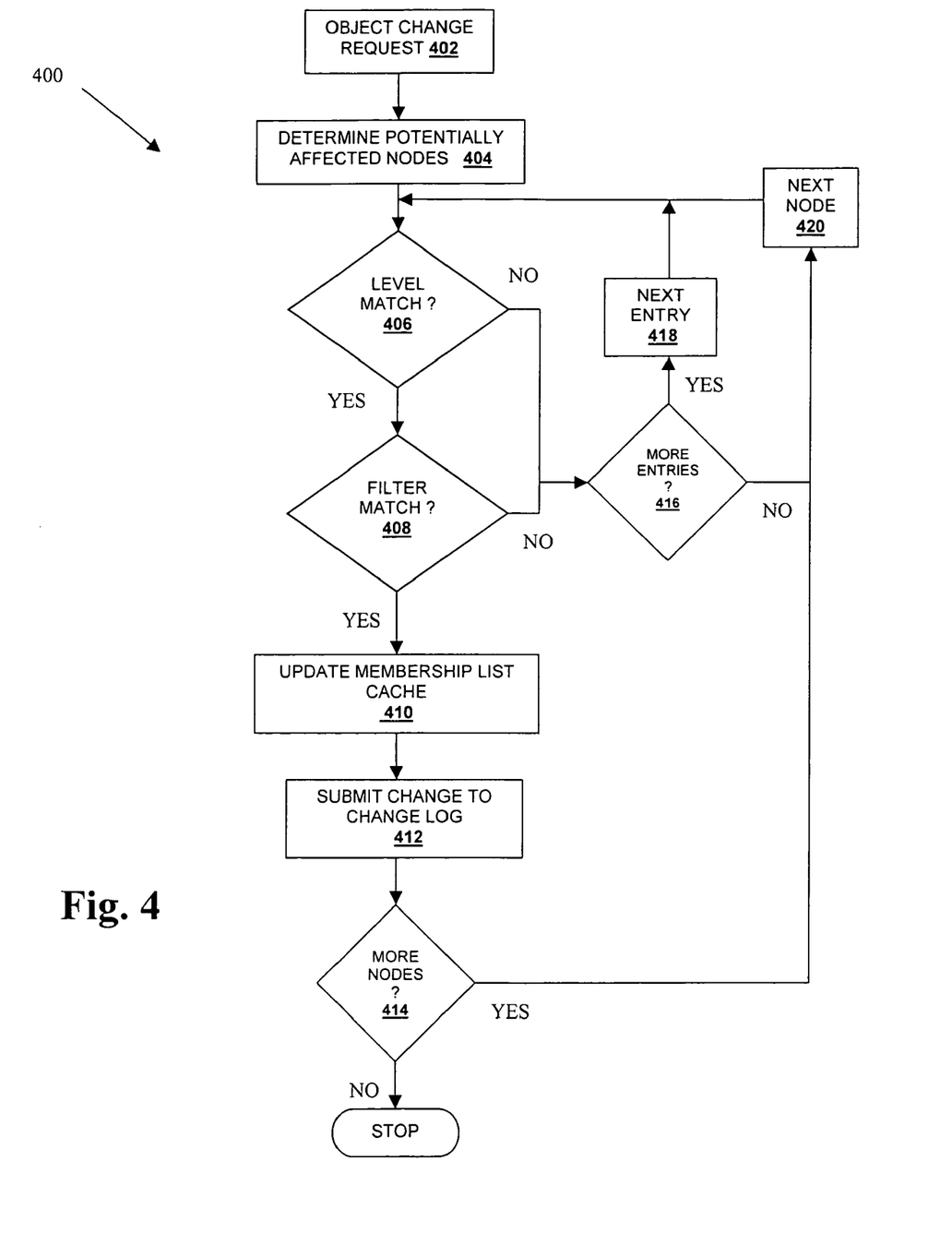
FIG. 4 is an illustration of process 400, the membership list modification process.

In some embodiments, when a member object is modified membership lists are examined to see which lists are affected. An embodiment of process 400, which is the membership object modification process, is shown in FIG. 4. A membership list object change has been requested in process action 402. Process action 404 determines the potentially affected nodes based on the List ID of the object in the request. The DN or List ID of the member object should have the same base as, or be a child node to, the potentially affected nodes. For each potentially affected node, process action 406 compares the level of the request to the level of each entry in the Link List for the node. Recall that the Link List stores the level and filters associated with each membership list in a node. If the level of the object does not match the level of the entry in the Link List, then the membership list associated with the entry is not affected by the modification. Process action 416 determines if there are more entries in the Link List of that node to check. If yes, process action 418 moves on to the next Link List entry. If there are no more Link List entries to check in that node, the process moves onto the next node in process action 420. If the level of the object does match the level of an entry in the Link List in process action 406, then process action 408 determines if the filter of the entry in the linked list applies to the object If the filters do not apply to the object process action 416 determines if there are more Link List entries to check in this node. If yes, process action 418 moves on to the next entry. If the filter in the linked list entry applies to the object, then process action 410 updates the cache of the membership list associated with the matched Link List level and filter entry.

In process action 410, the state of the cache is set to "being updated" while the member is physically added, deleted, or modified in the membership cache, and the state is returned to "valid" upon completion of the change. If a query to access the list is received during the update, the query executes the rules to build the membership list so as not to delay the query (as shown in process action 306 of FIG. 3). In process action 412 the change is submitted to the change log. Subscribers (e.g. applications and specific groups) of the change log are notified of changes. Process action 414 determines if there are more potentially affected nodes. If yes, process action 420 moves on to the next node to check the Link Lists of those nodes. If there are no more nodes, the process stops.

Figure 5:
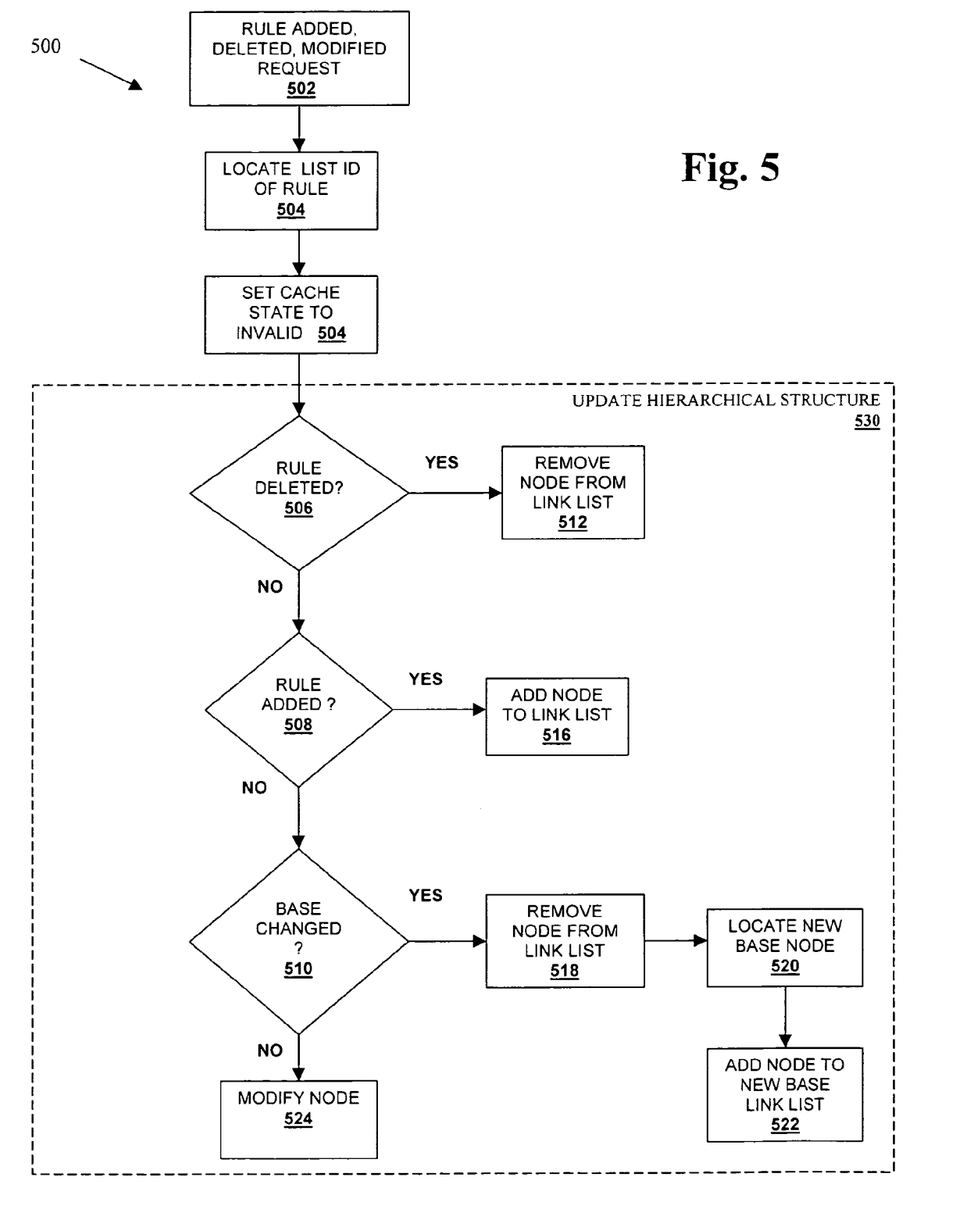
FIG. 5 is an illustration of process 500, the rule modification process

Another example change is when a membership rule is modified. An example embodiment of process 500, which is the rule modification process, is shown in FIG. 5. In process action 502 a rule modification is requested. In process action 504, the membership List ID contained in the request is used to locate the effected list. The cache state of the effected membership lists is set to "invalid" in process action 504. The next time one of these effected membership lists are accessed (process 300 in FIG. 3), the cache state is detected as "invalid" (310). As stated above, when the cache state is determined to be "invalid" in process 300, the cache is purged, the modified rules are executed to build the membership list, and the list is cached.

When a rule is modified the modifications may effect the hierarchy of the tree. For example, nodes may have to be created or moved. This possibility of a tree structure change is handled in element 530, the Update Hierarchical Structure section of FIG. 5. Process action 506 determines if a rule was deleted. If the rule was deleted, process action removes the corresponding node from the link list. If the rule was not deleted, process action 508 determines if a new rule was added. If a rule was added, process 516 adds a node to the appropriate link list. If a rule was not added, process action 510 determines if the base of a rule has changed. If the base of a rule has changed, process action 518 removes the corresponding node from the appropriate link list, process action 520 locates the new base node, and process action 522 adds a node to the link list of the new base node. If the base of the rule has not changed, this indicates that a filter criterion of the rule has changed (e.g., changing area code 650 to 707). In this case, process action 524 modifies the filter information of the node in the link list to reflect the change.

System Architecture Overview

Figure 6:
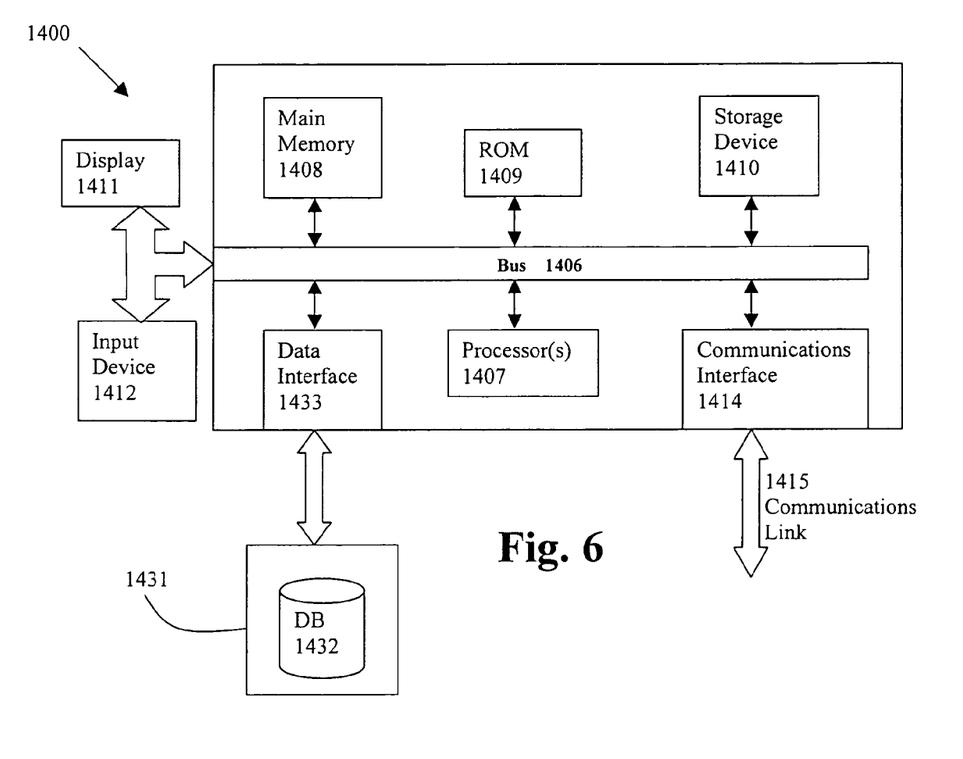
FIG. 6 is an illustration of an example system in which embodiments of a system for change notification and persistent caching of dynamically computed membership of rules-based lists in LDAP can be implemented.

The execution of the sequences of instructions required to practice the invention may be performed in embodiments of the invention by a computer system 1400 as shown in FIG. 6. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 6, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software. The term logic is defined as any hardware, software, or combination of hardware and software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer implemented method of membership list management, comprising:

executing a set of rules, by using a processor of a computer system, to create a computed rules-based membership list;

associating the computed rules-based membership list with a node in a hierarchical structure based at least in part upon the set of rules, wherein the hierarchical structure comprises a plurality of nodes, the plurality of nodes associating with a plurality of membership lists;

caching the computed rules-based membership list in a membership cache for retrieval in response to a later request for the computed rules-based list;

modifying the computed rules-based membership list by accessing the computed rules-based membership list that has been cached instead of executing membership rules to build a modified membership list;

modifying a hierarchy of the hierarchical structure, wherein modifying the hierarchy comprises:

receiving a rule change request comprising modification to a rule in the set of rules;

determining whether the computer rules-based membership list is a membership list affected by the rule change request;

determining whether the hierarchy of the hierarchical structure is affected by the rule change request;

changing the hierarchy of the hierarchical structure by adding or removing the node in the hierarchical structure based at least in part upon the rule change request; and storing the computed rules-based membership list in a volatile or non-volatile computer-usable medium or displaying the computed rules-based membership list on a display device.

2. The method of claim 1, wherein modifying the computed rules-based membership list further comprises:

modifying the affected computed rules-based membership list.

3. The method of claim 2, wherein modifying the computed rules-based membership list further comprises:

setting a cache state to being updated while the modification is in progress;

setting the cache state to valid when the modification is complete; and updating a change log based at least in part upon the modification.

4. The method of claim 3, wherein updating comprises:

sending a change notification based at least in part upon the change log.

5. The method of claim 1 further comprising accessing the computed rules-based membership list based at least in part upon an object change request, wherein accessing the membership list comprises:
- locating a membership list cache based at least in part upon the object change request;
- determining a cache state of the membership list cache; and
- accessing the membership list cache based at least in part upon the cache state.

6. The method of claim 5, wherein accessing further comprises:
- accessing the computed rules-based membership list in the membership list cache if the cache state is valid;
- computing the computed rules-based membership list if the cache state is being updated; and
- purging the membership list cache, computing the computed rules-based membership list, and storing the computed rules-based membership list in the membership list cache if the cache state is invalid.

7. The method of claim 1, wherein determining whether the computed membership list is affected comprises comparing a set of hierarchical information from the request to a set of hierarchical attributes of the membership lists.

8. The method of claim 7, wherein the hierarchical information comprises:
- a base, the base identifying a node in a hierarchy to which the computed rules-based membership list belongs;
- a level, the level identifying a depth of the computed rules-based membership list in the node hierarchy;
- a filter, the filter identifying one or more specific computed rules-based membership list attributes.

9. The method of claim 1, further comprising:
- modifying one of the set of rules based at least in part upon the rule change request.

10. The method of claim 9, wherein modifying one of the set of rules comprises:
- setting a cache state to invalid;
- modifying one or more hierarchical attributes of membership lists based at least in part upon the rule change request.

11. The method of claim 10, wherein modifying the one or more hierarchical attributes further comprises:
- moving a membership list ID from a link list of a base node to the link list of a new base node if the base of the rule changed;
- adding the membership list ID to the link list of the new base node if the rule was added;
- removing the membership list ID from the link list of the base node if the rule was deleted; and
- modifying the membership list ID information if the rule was modified.

12. A computer program product comprising a volatile or non-volatile computer-usable medium, the computer-usable medium having stored thereon a sequence of instructions which, when executed by a processor, causes the processor to execute a method for membership list management, the method comprising:
- executing a set of rules to create a computed rules-based membership list;
- associating the computed rules-based membership list with a node in a hierarchical structure based at least in part upon the set of rules, wherein the hierarchical structure comprises a plurality of nodes, the plurality of nodes associating with a plurality of membership lists;
- caching the computed rules-based membership list in a membership cache for retrieval in response to a later request for the computed rules-based list;
- modifying the computed rules-based membership list by accessing the computed rules-based membership list that has been cached instead of executing membership rules to build a modified membership list;
- modifying a hierarchy of the hierarchical structure, wherein modifying the hierarchy comprises:
  - receiving a rule change request comprising modification to a rule in the set of rules;
  - determining whether the computer rules-based membership list is a membership list affected by the rule change request;
  - determining whether the hierarchy of the hierarchical structure is affected by the rule change request;
  - changing the hierarchy of the hierarchical structure by adding or removing the node in the hierarchical structure based at least in part upon the rule change request; and
- storing the computed rules-based membership list or displaying the computed rules-based membership list on a display device.

13. The computer program product of claim 12, wherein modifying the computed rules-based membership list further comprises:
- modifying the affected computed rules-based membership list.

14. The computer program of claim 13, wherein modifying the computed rules-based membership list further comprises:
- updating a change log based at least in part upon the modification; and
- sending a change notification based at least in part upon the change log.

15. The computer program product of claim 13 further comprising accessing the computed rules-based membership list based at least in part upon an object change request, wherein accessing the computed rules-based membership list comprises:
- locating a membership list cache based at least in part upon the object change request;
- determining a cache state of the membership cache; and
- accessing the membership list cache based at least in part upon the cache state.

16. The computer program product of claim 14 wherein determining whether the computed rules-based membership list is affected comprises comparing a set of hierarchical information from the request to a set of hierarchical attributes of the membership lists.

17. The computer program product of claim 16, wherein the hierarchical information comprises:
- a base, the base identifying a node in a hierarchy to which the computed rules-based membership list belongs;
- a level, the level identifying a depth of the computed rules-based membership list in the node hierarchy;
- a filter, the filter identifying one or more specific membership list attributes.

18. The computer program product of claim 12, further comprising:
- modifying one of the set of rules based at least in part upon a rule change request;
- modifying one or more hierarchical attributes of membership lists based at least in part upon the rule change request.

19. A computer system for membership list management, the system comprising:
- a processor for executing a set of rules to create a computed rules-based membership list;

a membership cache for caching the computed rules-based membership list for retrieval in response to a later request for the computed rules-based list;

the processor configured for:

modifying the computed rules-based membership list by accessing the computed rules-based membership list that has been cached instead of executing membership rules to build a modified membership list;

modifying a hierarchy of the hierarchical structure, wherein the processor is further configured for:

receiving a rule change request comprising modification to a rule in the set of rules;

determining whether the computer rules-based membership list is a membership list affected by the rule change request;

determining whether the hierarchy of the hierarchical structure is affected by the rule change request;

changing the hierarchy of the hierarchical structure by adding or removing the node in the hierarchical structure based at least in part upon the rule change request; and a volatile or non-volatile computer-usable medium for storing the computed rules-based membership list or a display device for displaying the computed rules-based membership list.

20. The system of claim 19, wherein modifying the computed rules-based membership list further comprises:

modifying the affected computed rules-based membership list.

21. The system of claim 19, wherein modifying the computed rules-based membership list further comprises:

updating a change log based at least in part upon the modification; and sending a change notification based at least in part upon the change log.

22. The system of claim 20 further comprising means for accessing the computed rules-based membership list based at least in part upon an object change request, wherein accessing the computed rules-based membership list comprises:

locating a membership list cache based at least in part upon the object change request;

determining a cache state of the membership list cache; and accessing the membership list cache based at least in part upon the cache state.

23. The system of claim 22 wherein the act of modifying the computed rules-based membership list comprises comparing a set of hierarchical information from the object change request to a set of hierarchical attributes of the computed rules-based membership list.

24. The system of claim 23, wherein the hierarchical information comprises:

a base, the base identifying a node in a hierarchy to which the computed rules-based membership list belongs;

a level, the level identifying a depth of the computed rules-based membership list in the node hierarchy;

a filter, the filter identifying one or more specific computed rules-based membership list attributes.

25. The system of claim 19, the act of modifying the rule further comprising:

modifying one of the set of rules based at least in part upon the rule change request;

modifying one or more hierarchical attributes of membership lists based at least in part upon the rule change request.

26. A membership list management system comprising:

a processor for executing instructions;

a set of rules which when executed by the processor that produces a computed rules-based membership list;

a storage device which caches the computed rules-based membership list, wherein the computed rules-based membership list is cached for retrieval in response to a later request for the computed rules-based membership list;

a cache accessing module that can retrieve data from the computed rules-based membership list, wherein the cache accessing module can modify the computed rules-based membership list by accessing the computed rules-based membership list that has been cached instead of executing membership rules to build a modified membership list; and a cache updating module which can modify the computed rules-based membership lists by accessing the computed rules-based membership list that has been cached instead of executing membership rules to build a modified membership list;

a rule modifying module which can make changes to rules, wherein the rule modifying module is configured for:

receiving a rule change request comprising modification to a rule;

determining whether the computer rules-based membership list is a membership list affected by the rule change request;

determining whether a hierarchy of the hierarchical structure is affected by the rule change request;

changing the hierarchy of the hierarchical structure by adding or removing the node in the hierarchical structure based at least in part upon the rule change request; and a volatile or non-volatile computer-usable medium for storing the computed rules-based membership list or displaying the computed rules-based membership list on a display device.

27. The system of claim 26, further comprising:

a rule modification module which can modify the set of rules and update hierarchical information; and a change notification module which can transmit change notices.

28. The system of claim 26, wherein each membership list is represented by an entry in a link list of a base node, the entry including a list ID, a level, and filter information.

29. The system of claim 28 wherein the entry in the link list is utilized to locate the membership list.

* * * * *